May 15, 1962  W. T. McKAY  3,034,566
APPARATUS FOR MAKING GLASS FIBER RODS
Filed Feb. 11, 1959  11 Sheets-Sheet 2
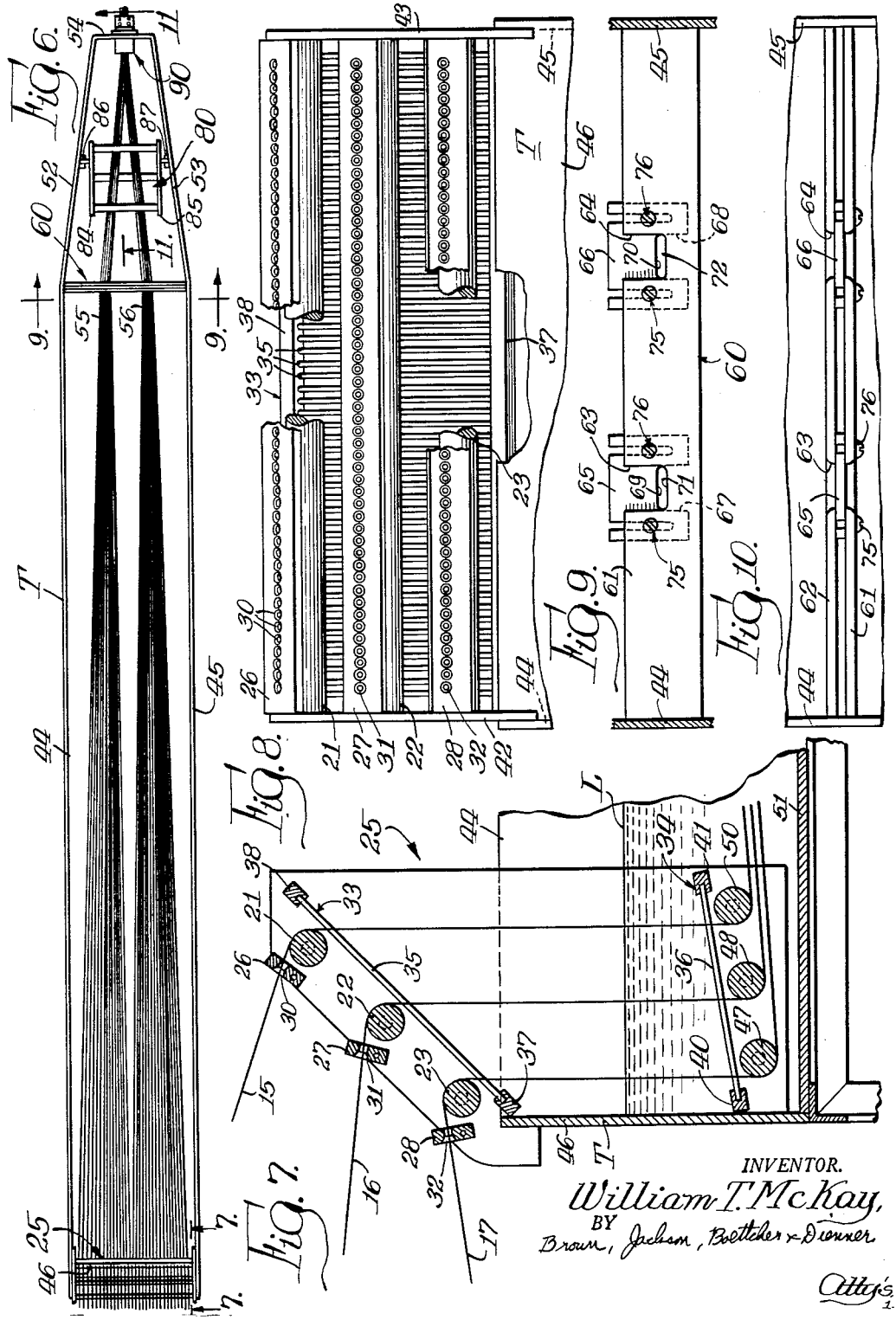
INVENTOR.
William T. McKay,
BY Brown, Jackson, Boettcher & Dienner
Att'ys

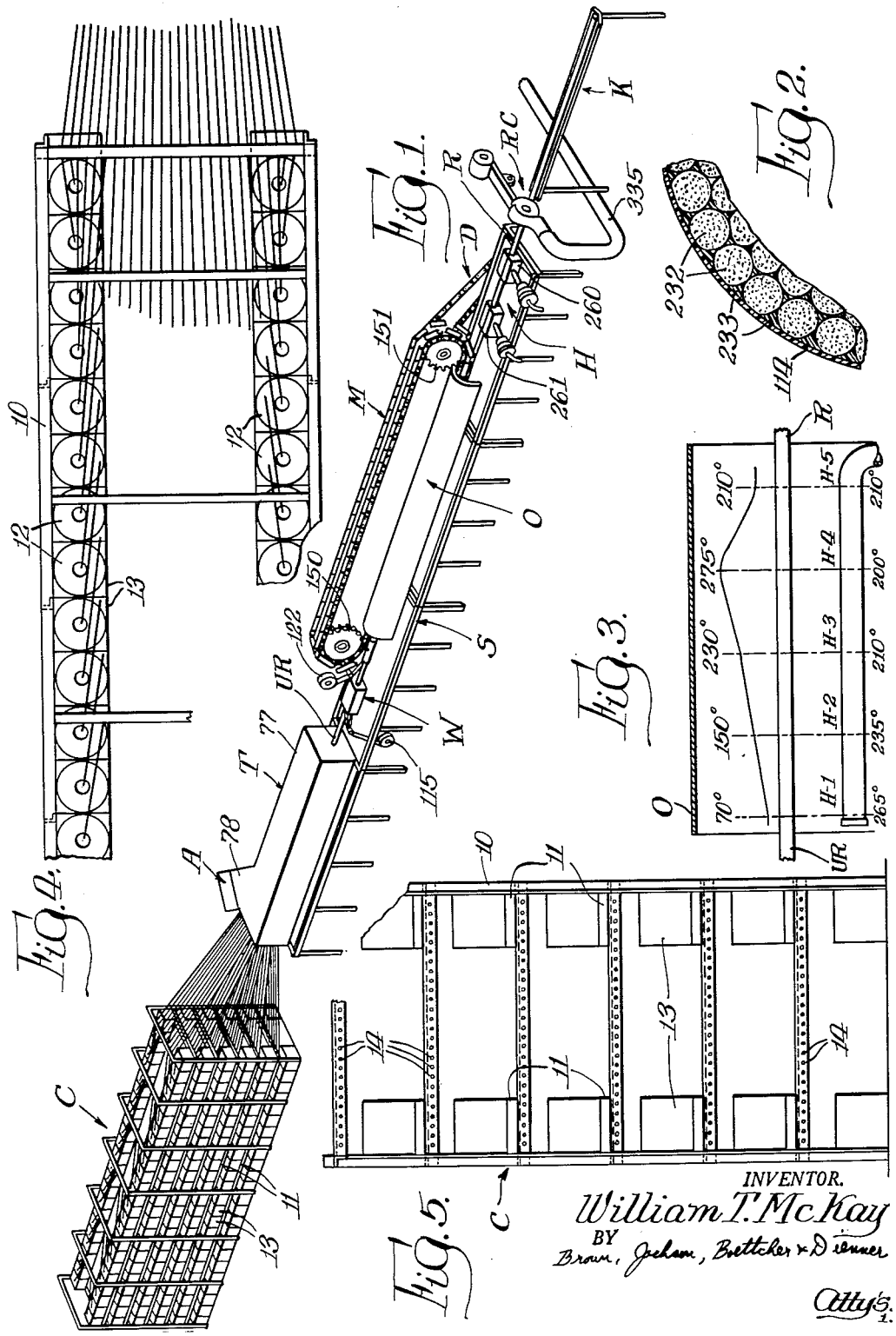

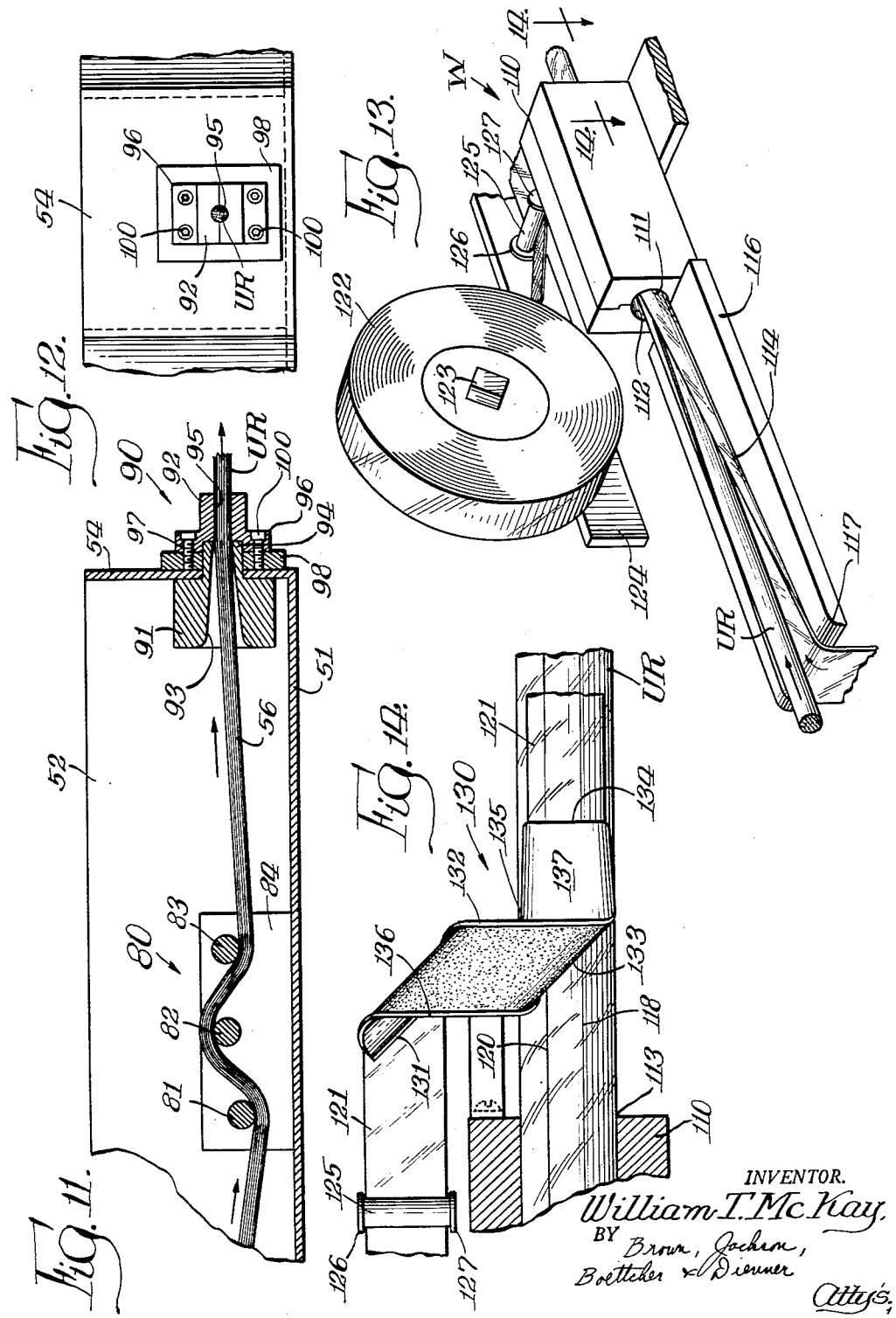

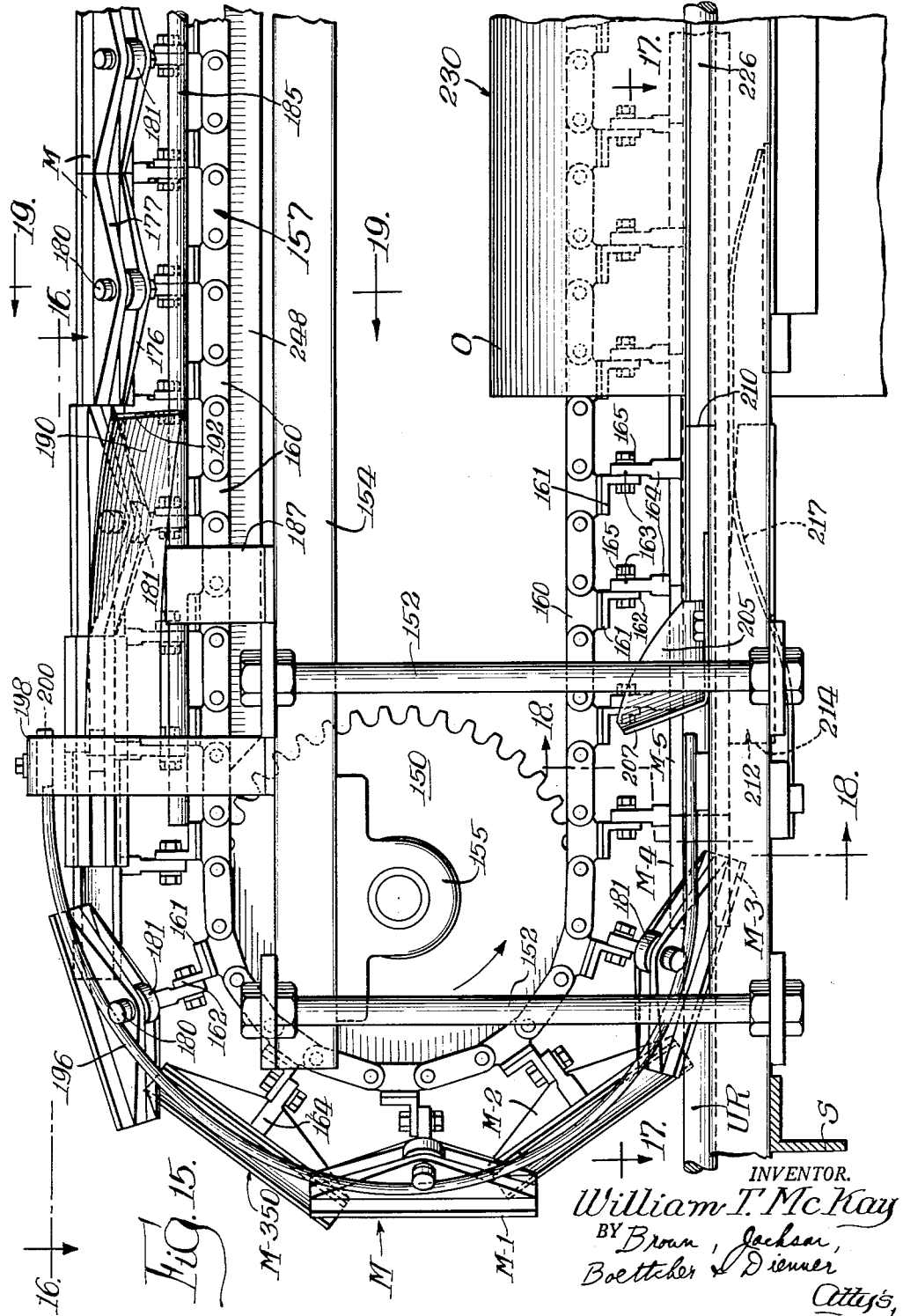

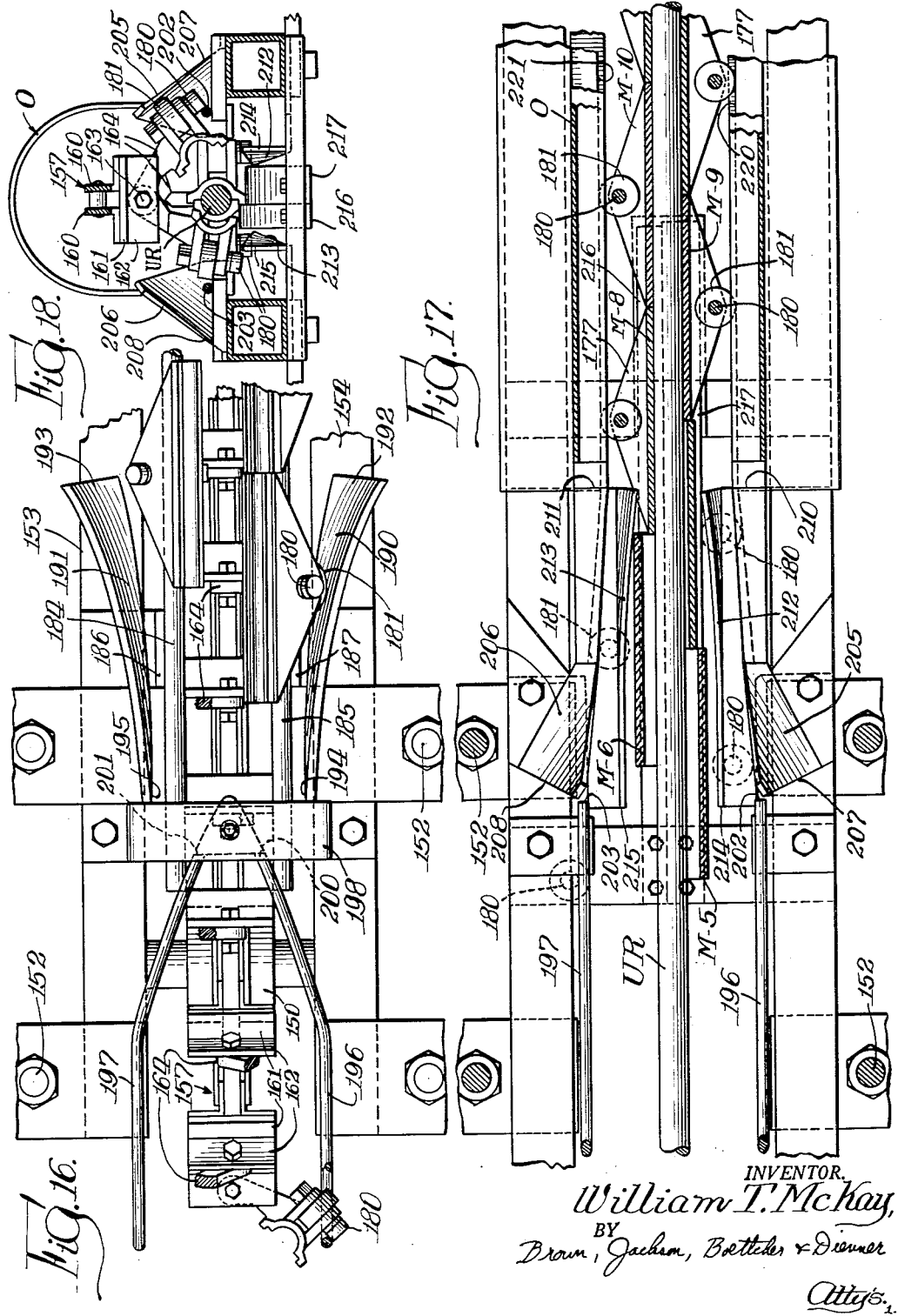

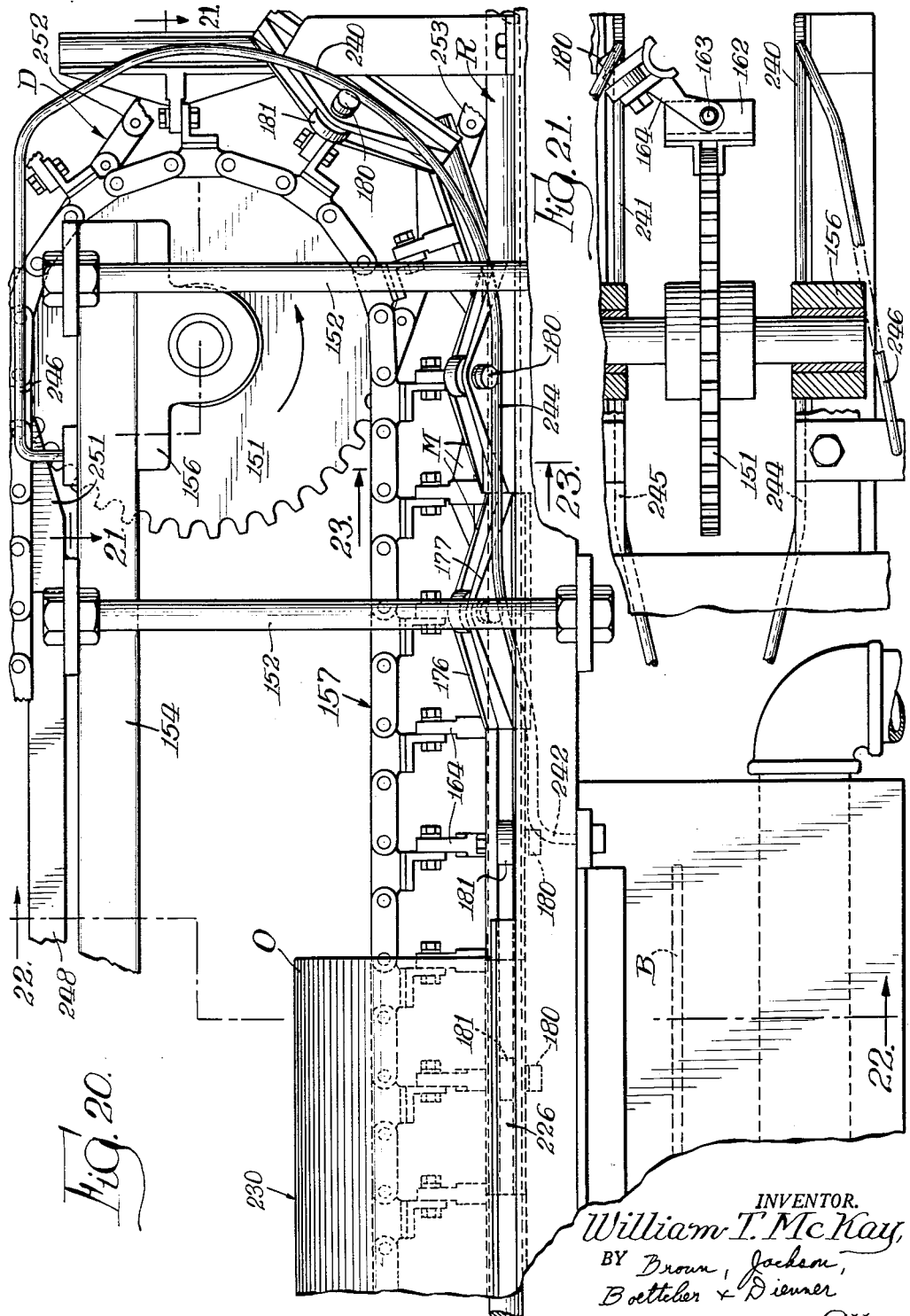

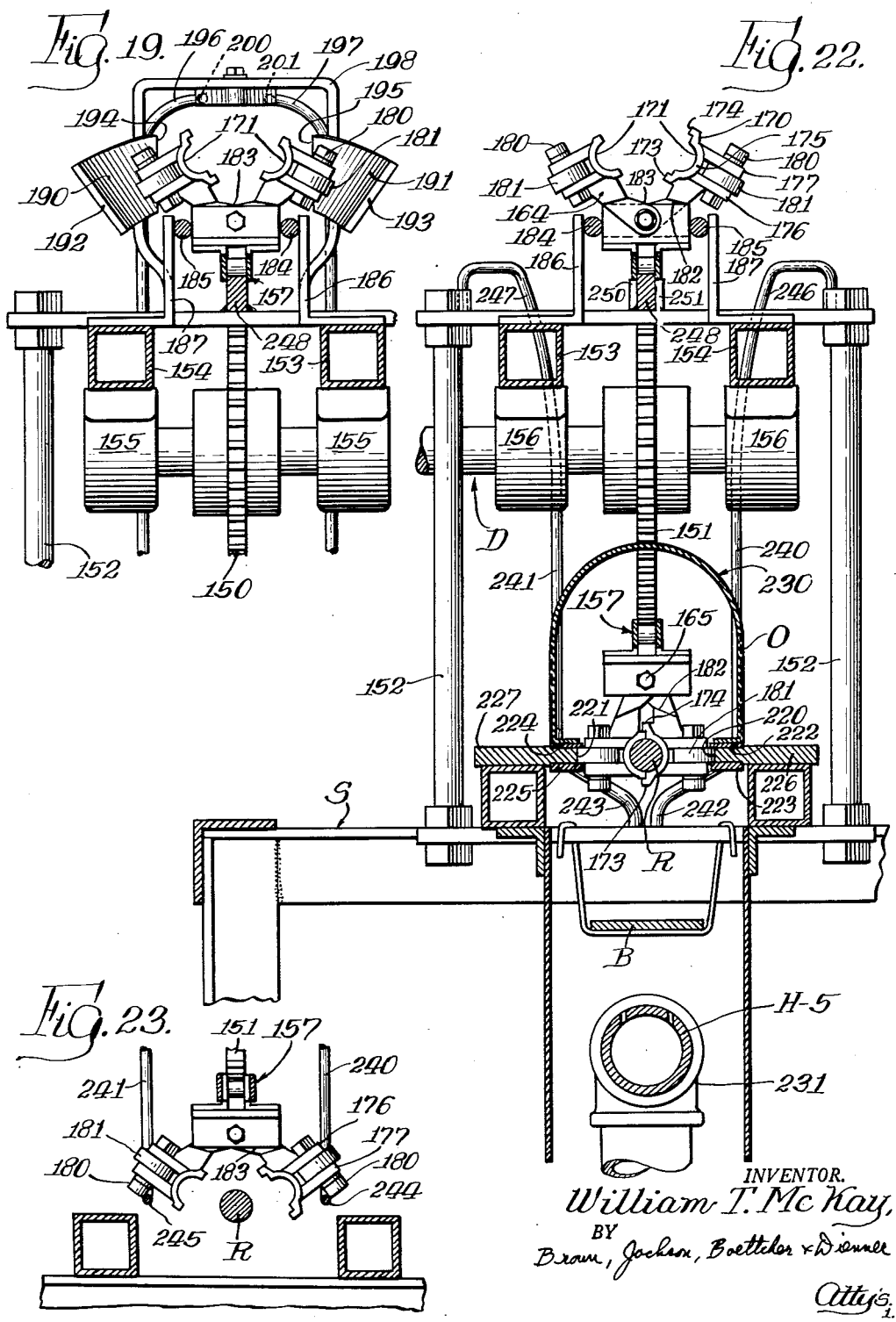

May 15, 1962 W. T. McKAY 3,034,566
APPARATUS FOR MAKING GLASS FIBER RODS
Filed Feb. 11, 1959 11 Sheets-Sheet 8
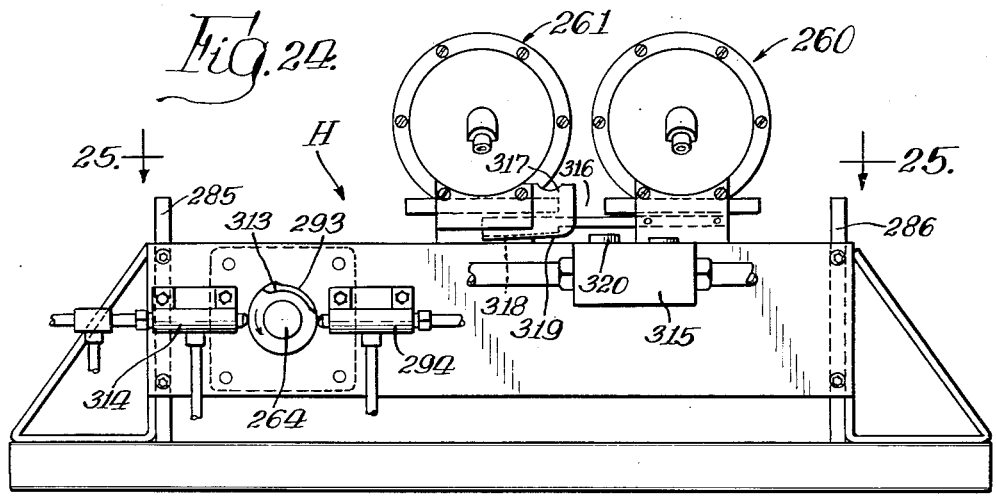
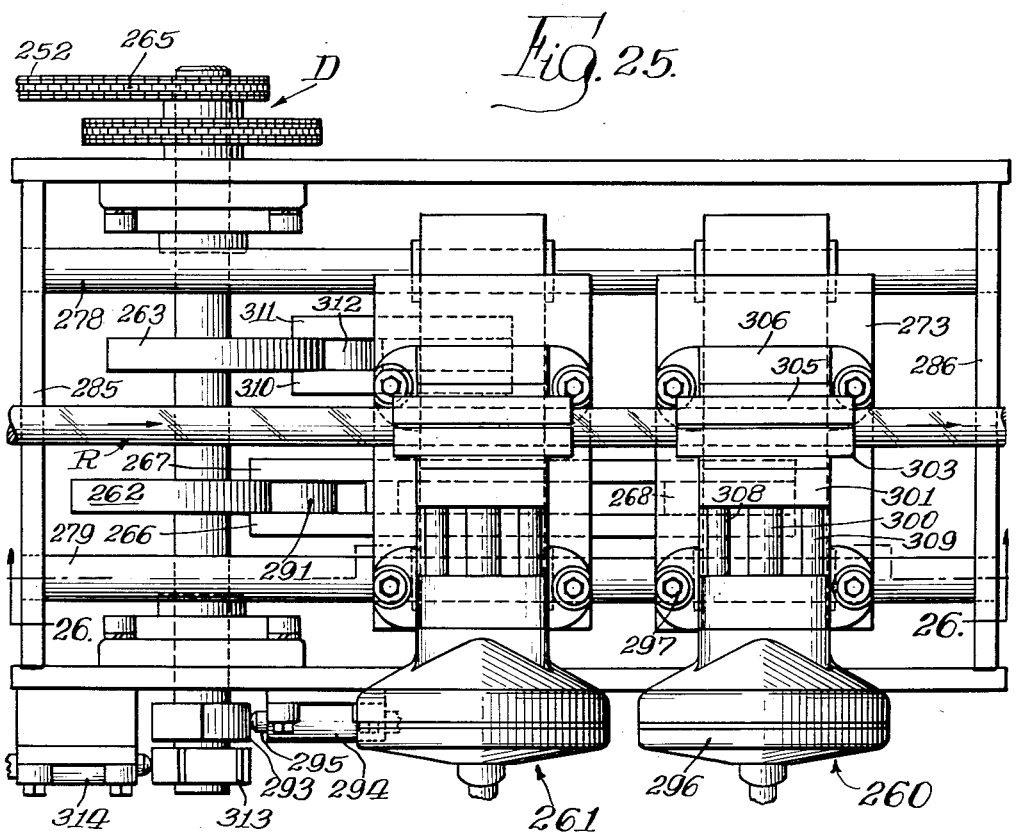
INVENTOR.
William T. McKay
BY
Brown, Jackson, Boettcher & Dienner
Atty's

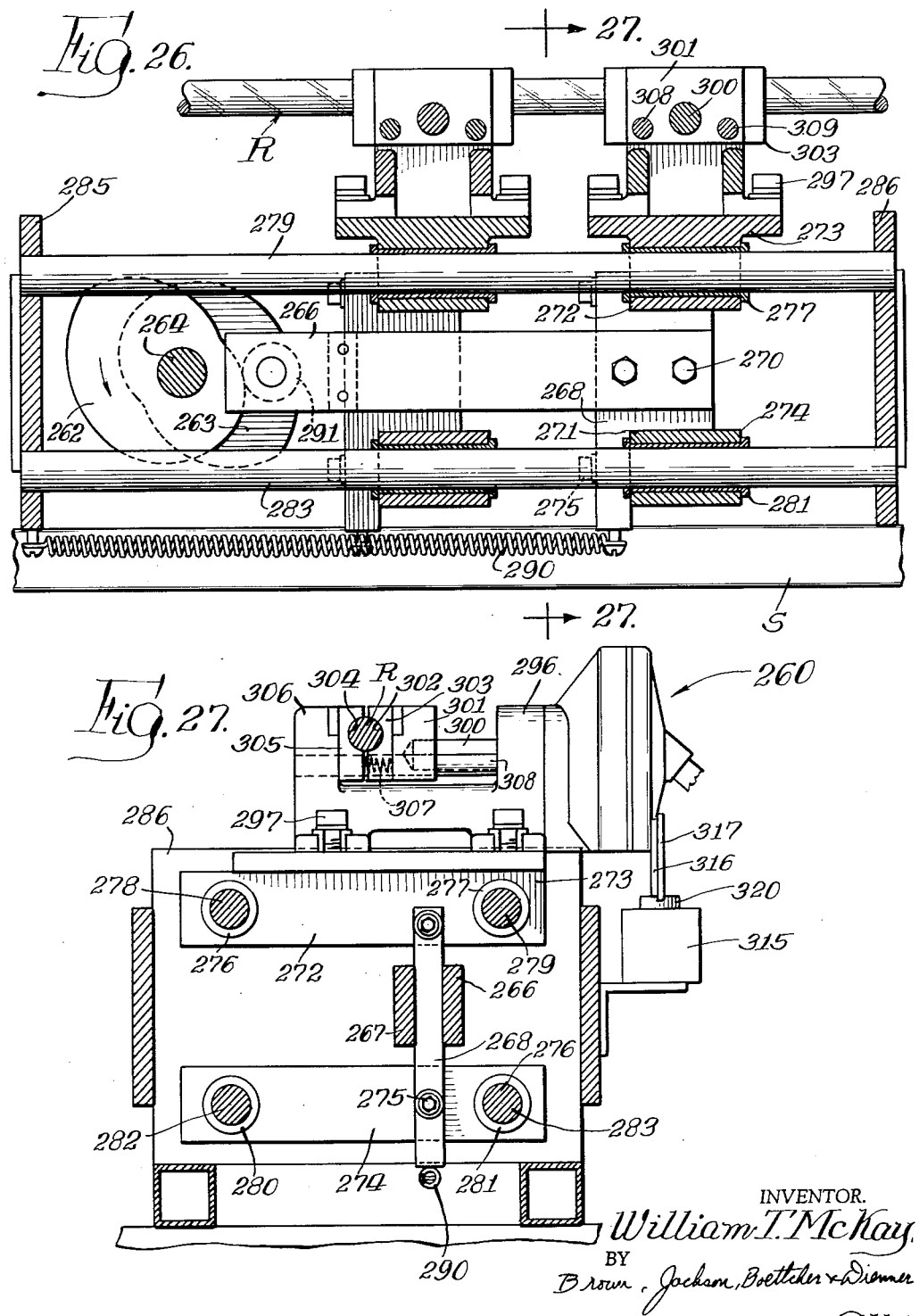

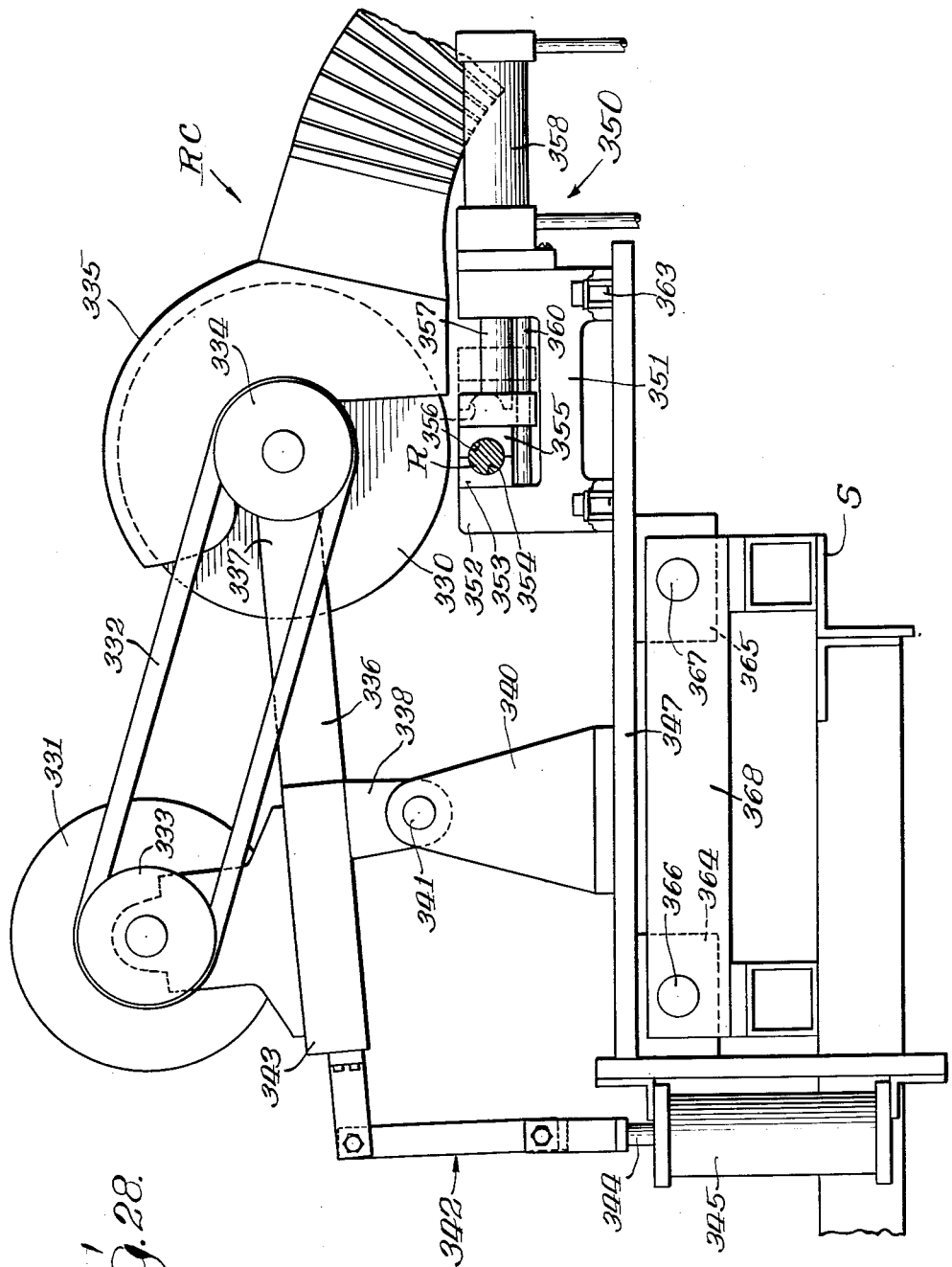

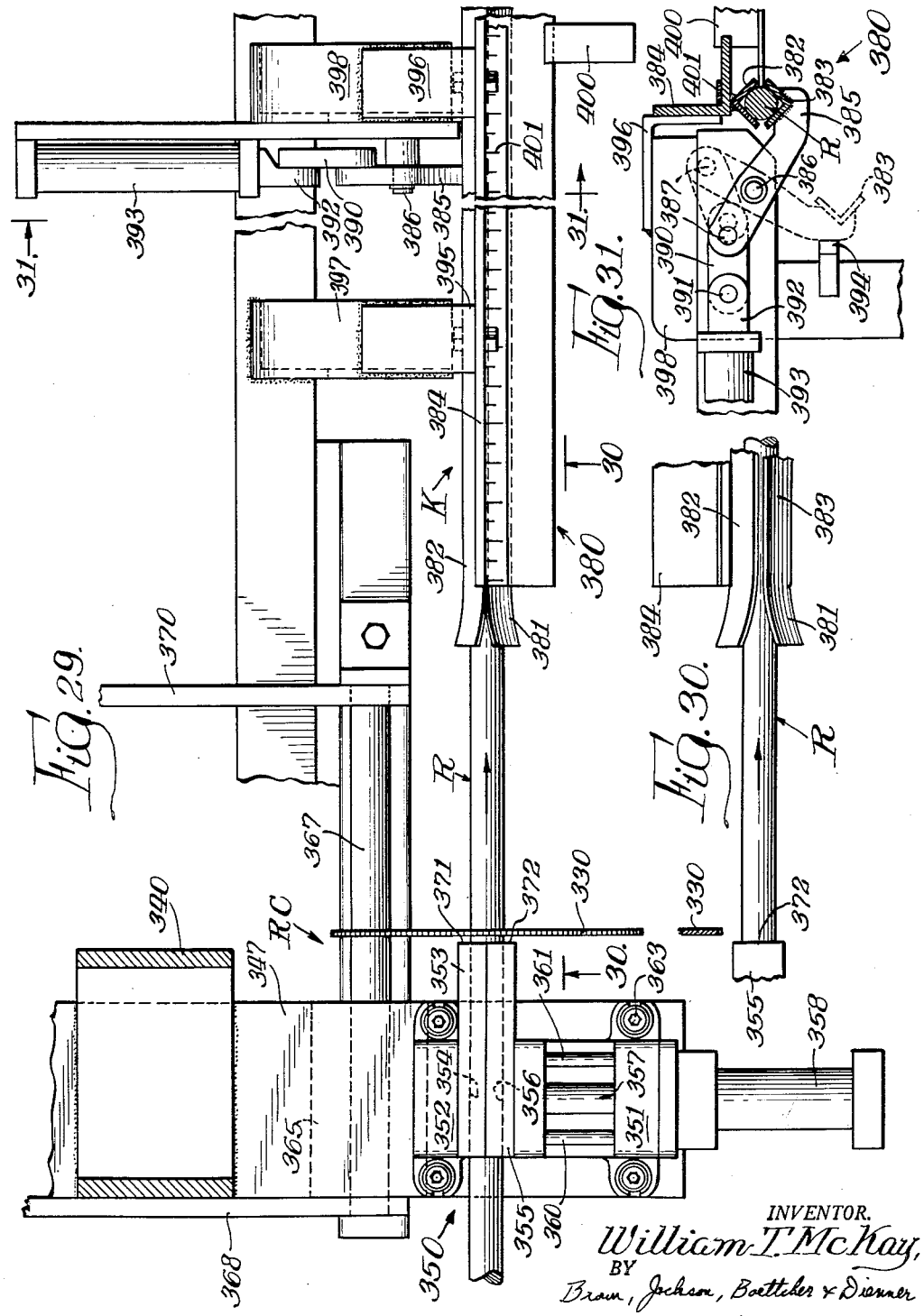

United States Patent Office 3,034,566
Patented May 15, 1962

3,034,566
APPARATUS FOR MAKING GLASS FIBER RODS
William T. McKay, Chicago Heights, Ill., assignor to Empire Metal Products Co., Cicero, Ill., a corporation of Illinois
Filed Feb. 11, 1959, Ser. No. 792,647
5 Claims. (Cl. 156—441)

This invention relates, in general, to the fabricating of fiber glass reinforced rod and has for its principal object the provision of a new and improved method and apparatus for fabricating a continuous length of such glass rod into a desired cross-sectional shape without further fabrication, which rod may be cut into desired lengths.

Heretofore, in the fabrication of glass rods, it has been necessary either to mold the rods directly into the desired length and shape by a molding process which is time consuming and complex, or to provide a means of continuously curing the rods in a length which could be cut as desired. This latter was an endless process of continuously drawing a plurality of threads through a bed of liquid heat-hardenable resin, gathering the threads into a bundle, compressing the bundle through a sizing die into a predetermined cross-sectional shape and size, and curing the rod in an oven. Later the rods could be cut into the desired lengths.

This latter described process, although suitable for such glass rods as ultimately used for fishing rods and the like, was unsuitable for other uses. The reason for this is that the process, after the cutting of the rods into the desired lengths further included grinding the rods into their desired tapered and/or cylindrical shape. This process also was defective because it was usually found necessary for such rods to be made oversize (1) to accommodate the grinding step and (2) to finish the rod surface found to be pithy and cloudy with several of the fine threads from the individual rovings radiating from the surface. This contributed largely to the undesirability of the rod. Too, such process, notwithstanding the rod having been drawn through a sizing die, did not make a truly circular cylindrical rod, but rather a polygon shaped rod which was not undesirable when used for fishing rods for the reason that the same were ultimately ground into their final diameter anyway, but definitely undesirable for other uses.

Too, as can be appreciated, the grinding of the fibers and the like which were radiating from the surface and to make the rod cylindrical, destroyed to some extent at least, the strength of the rod because the grinding cut the longitudinal fibers. Too, there was a certain amount of loss in making the rod oversize in both the number of glass fibers as well as in the resin.

It is found also that this process was particularly defective because it lacked proper control of the chemical reaction during the curing step and any stopping or starting of the machine resulted in a loss of resin as well as in time, since there was no control over the resin in its liquid form.

It has been suggested in such processes of making fiber glass rods that the material be spirally wound with a film while still in its uncured state in order to control the peripheral curvature of the rod. However, such a suggestion was defective for the reason that the spiral winding of the rods had not been easy to accomplish because the glass rod in its uncured step was not supported when wound. Thus the wrapping of the rod about a substantially fluid uncured rod put a tension on the rod crosswise and pulled it out of its circular shape as it left any sizing die, and before the rod entered the curing ovens.

Too, such processes, whether wrapped or unwrapped, as the rod entered the curing ovens, lacked proper support and were not held to the degree that is necessary while the curing step took place. Thus, to some degree at least, this lack of proper support while being cured is thought to contribute to the irregular shape of the uncured rod, and the inability to control the curing of the rod to produce a surface that is clear and smooth.

I have improved the prior art method and apparatus for making glass rods by the provision of a new and improved method and apparatus which comprise briefly: pulling glass fiber threads through a bed of liquid heat hardenable material; gathering the threads into bundles of predetermined cross-sectional size and shape; squeezing out any air entrained between the threads as they are passing through this bed of liquid heat hardenable material; pulling the threads through a sizing die of a predetermined cross-sectional shape which will give the uncured rod the correct ratio of resin to the threads; wrapping the uncured rod, while being properly supported, such wrapping film to be wrapped in an overlapping longitudinal direction as distinguished from wrapping the rods spirally, and which is substantially liquid tight; passing the wrapped rod through a plurality of traveling molds which hold the rod squeezed and at a correct shape as the molds travel through the curing oven. As will be seen, I have disclosed one embodiment of an apparatus for accomplishing the above steps, and to accomplish the pulling of the rod from the spools through the curing oven, I have provided a new and improved hitch feed mechanism which provides a continuous, smooth, constant velocity movement for the rod, and I have also provided a new and improved cut-off mechanism whereby the rod may be cut into the desired length and dropped out automatically from the machine. The wrapping film may be removed if desired.

Accordingly, it is a specific object of my invention to provide a new and improved apparatus for making a glass fiber reinforced rod of true cross-sectional size and shape which may be used as it leaves the machine without further grinding.

Still another object of my invention is to provide a new and improved method for making glass fiber rod of true cross-sectional shape and size which may be used as such without further grinding and the like.

Still another and specific object of my invention is to provide new and improved structural mechanisms throughout the various parts of the machine to accomplish the general objects set forth herein.

Other and more particular objects of my invention will be apparent to those skilled in the art from the following description and drawings forming a part hereof and wherein:

FIGURE 1 is a perspective illustration of a glass fiber rod making machine constructed in accordance with the teaching of my present invention;

FIGURE 2 is a fragmentary and enlarged cross-sectional view, illustrating a portion of a glass rod produced by the machine illustrated in FIGURE 1;

FIGURE 3 is a schematic diagram illustrating representations of the various temperatures in the curing oven of my machine and the exotherm reaction temperatures of the rod in the oven;

FIGURE 4 is an enlarged fragmentary plan view of the machine illustrated in FIGURE 1 showing the supporting stand or creel for supporting a plurality of spools of glass thread or rovings;

FIGURE 5 is a front elevational fragmentary view of the creel illustrated in FIGURES 1 and 4;

FIGURE 6 is a top plan view of the tank in which the rovings gathered from the spools are immersed in the hardenable resin and formed into a bundle forming an uncured rod of predetermined cross-sectional shape and size;

FIGURE 7 is an enlarged fragmentary view, taken along line 7—7 of FIGURE 6, looking in the direction of the arrows, and illustrating the comb guide means for introducing the threads into the resin tank illustrated in FIGURE 6;

FIGURE 8 is a front view of the top half of the comb guide means illustrated in FIGURE 7, partially broken away, to show in detail the various parts thereof;

FIGURE 9 is an elevational view of an adjustable thread gathering means which also serves to remove entrained air from the threads immersed in the tank of hardenable resin and taken along lines 9—9 of FIGURE 6 looking in the direction of the arrows;

FIGURE 10 is a top view of the thread gathering means illustrated in FIGURE 9;

FIGURE 11 is an enlarged, elevational fragmentary cross-sectional view, taken along line 11—11 of FIGURE 6, looking in the direction of the arrows, and illustrating to advantage a means for tensioning the threads, and a sizing die means of forming the threads into a bundle of uncured rod as the threads leave the resin tank;

FIGURE 12 is a front elevational view of the sizing die for forming the uncured rod, as illustrated in FIGURE 11;

FIGURE 13 is a fragmentary perspective view showing a means of wrapping the uncured glass rod with a film as it leaves the sizing die illustrated in FIGURES 11 and 12;

FIGURE 14 is a top view of a portion of the wrapping means as illustrated in FIGURE 13, taken along line 14—14 of FIGURE 13, looking in the direction of the arrows and showing a means for applying an adhesive to the wrapper film fastening the wrapper film to the uncured glass rod;

FIGURE 15 is a fragmentary elevational view illustrating to advantage a portion of traveling molds which seize and squeeze the wrapped uncured glass rod prior to its entrance into the curing ovens and a portion of the molds returning from the curing oven;

FIGURE 16 is a top plan view of that portion of the traveling molds as they return from the curing oven, taken along line 16—16 of FIGURE 15 and looking in the direction of the arrows;

FIGURE 17 is a cross-sectional plan view of that portion of the travelling molds immediately prior to their entrance into the curing oven as the molds close about the uncured glass rod, taken along line 17—17 of FIGURE 15 and looking in the direction of the arrows;

FIGURE 18 is a cross-sectional elevational view of that portion of the travelling molds illustrated in FIGURES 15 and 17, illustrating to advantage the travelling molds as they gather and squeeze the uncured glass rod prior to their entrance into the curing oven;

FIGURE 19 is a cross-sectional view of that portion of the travelling molds illustrated in FIGURES 15 and 16, taken along line 19—19 of FIGURE 15, looking in the direction of the arrows, and showing the molds returned from the oven and about to be made ready to squeeze the uncured rod;

FIGURE 20 is a side elevational view, partially in section, illustrating to advantage the travelling molds as they leave the curing ovens and are opened;

FIGURE 21 is a fragmentary top plan view showing the opened travelling molds as they return to the position illustrated in FIGURES 15 and 19, such view being taken along line 21—21 of FIGURE 20 and looking in the direction of the arrows;

FIGURE 22 is an elevational sectional view taken along line 22—22 of FIGURE 20, looking in the direction of the arrow, showing that portion of the travelling molds immediately after they leave the curing oven but still holding the rod as well as after they are open to return to the position shown in FIGURE 19 and to the oven entrance;

FIGURE 23 is an elevational end view, taken along lines 23—23 of FIGURE 20, looking in the direction of the arrows, and showing the travelling molds as they leave the oven and open;

FIGURE 24 is a side elevational view of hitch feed mechanism for drawing the glass rod from the creel through the resin tank and the travelling molds;

FIGURE 25 is an enlarged top plan view of the hitch feed mechanism, illustrated in FIGURE 24, taken along line 25—25 of FIGURE 24 and looking in the direction of the arrows;

FIGURE 26 is an enlarged cross-sectional view of the hitch feed mechanism, illustrated in FIGURES 24 and 25, taken along line 26—26 of FIGURE 25 to illustrate to advantage the cam actuated travelling vises of the hitch feed mechanism;

FIGURE 27 is an elevational cross-sectional view taken along line 27—27 of the hitch feed mechanism shown in FIGURE 26 and looking in the direction of the arrows;

FIGURE 28 is an end elevational view, partly in section, of a means for cutting the finished rod into the predetermined lengths;

FIGURE 29 is a top plan view of the cut-off means illustrated in FIGURE 28, illustrating to advantage the cut-off means for measuring the rods into the predetermined lengths;

FIGURE 30 is a fragmentary view of the entrance into a rod measuring means as the same leaves the cut-off means of FIGURE 29, taken along line 30—30 of FIGURE 29 and looking in the direction of the arrows;

FIGURE 31 is a cross-sectional view taken along line 31—31 of FIGURE 29, illustrating a means for dropping out the cut rods from the rod measuring means.

Turning now again to FIGURE 1 of the drawings, it can be seen that the apparatus for making the fiber glass rods comprises a creel C for holding spools of glass threads, a tank T containing, among other things, a bed of liquid heat-hardenable resin, and a sizing die for forming the uncured rod; a wrapping means W for wrapping the uncured rod prior to its entrance into the oven O where it is held by the traveling molds M; a hitch feed mechanism H for pulling the rod and threads from the creel C, a driving means D for the traveling molds and the hitch feed mechanism, and a rod cutting means R, and measuring and drop-out mechanism K.

As can be appreciated from this overall view of my machine, glass fiber threads from creel C enter the tank T to form an uncured rod which is wrapped by the wrapping means W, and is held in molds M as it is cured in oven O. The rod is continuously pulled from the creel C by the hitch feed mechanism H and driving means D, and is ultimately cut off by the cutting mechanism RC into the desired lengths, and dropped out at and by drop-out mechanism K. All of my machine except creel C is supported on a supporting frame S for convenience.

Turning now in particular to FIGURES 1, 4, and 5, the creel C can be seen to comprise a relatively long frame structure 10, made of angle irons or other suitable material, for supporting shelves 11, on which are placed a plurality of spools of glass fiber threads or rovings 12. These rovings are preferably placed on shelves 11 on the creel in the boxes or containers 13 in which they are usually received from a source of supply, and fed through a plurality of horizontally disposed eyelets 14. Eyelets 14 are set in rows at the end of the creel adjacent tank T; one row (six shown) for each group of spools on each pair of shelves of the creel, and while I have shown each spool in FIGURE 4 feeding through the eyelets 14, obviously, such spools could be set beside spare and connected spools for continuous operation. Too, more eyelets may be provided than are used if the number of spools were to be increased for a larger glass rod and the eyelets could be formed of separate parts by eye-screws, if necessary or desirable.

In FIGURES 6, 7, and 8, it can be seen that the rovings coming from creel 10 are grouped in three groups—15, 16, and 17 (two rows of rovings being accommodated in each group—about three round bars, 21, 22, and 23, forming part of a comb guide means indicated in its entirety as 25. These bars are preceded by three relatively flat, relatively long, plate members 26, 27, and 28, each of which are plurally apertured throughout its length, as at 30, 31, and 32 (FIGURE 8), so that the groups 15, 16, and 17 of rovings may be combed by a pair of combing members 33 and 34. Combing members 33 and 34 each comprise a plurality of rods, indicated in their entirety as 35 and 36, disposed respectively between the horizontal end plates 37, 38, 40 and 41, the number of rods in each comb corresponding to the number of apertures 30, 31, 32 in the plate members 26, 27, and 28, and are disposed in misalignment with said apertures so that the rods themselves provide elongated spaces therebetween in operative alignment with said apertures 30, 31, and 32. As can be appreciated, combs 33 and 34, plates 26, 27, 28, and bars 21, 22, and 23 are each located so as to maintain the sections of the threads as they enter the liquid L in the tank T in correct alignment by being mounted oblique on a pair of end mounting plates 42 and 43. End mounting plates 42, 43 are mounted on the opposite plates 44, 45, and end plate 46 of the tank T. Comb 33 is located on the side opposite plate members 26, 27, and 28 from the bars 21, 22, and 23, whereas the comb 34 is located preceding the bars 47, 48, and 50; comb 34 serving to guide the threads over the latter bars. It can be seen from a study of FIGURES 7 and 8 that the comb guide means 25 for the thread from the creel C first serve to direct the threads downwardly at right angles to the liquid L and space the threads from one another, and second, serve to direct the threads horizontally along or parallel to the bottom of the tank T, yet spaced from one another so that the groups of threads become thoroughly wet from the heat-hardenable resin L disposed in the tank T.

While I have shown comb 33 in this disclosure of my invention, actually comb 33 may be omitted because apertures 30, 31, and 32 will perform a combing function to guide threads over bars 21, 22, and 23.

As can be seen in FIGURE 6, tank T comprises an elongated tank, preferably of sheet aluminum or other suitable material having the previously mentioned sides 44, 45, and end 46, as well as bottom 51. Tank T is preferably long and narrow and the sides taper, as at 52 and 53, towards the end 54, so that the threads entering tank T in the comb guide means 25, previously described and shown in FIGURES 7 and 8, will move towards the end 54, that is, to the right as shown in the drawings, and at the same time be gathered into two groups 55, 56, at a gathering means indicated in its entirety as 60, and shown in detail in FIGURES 9 and 10.

As shown in these FIGURES 9 and 10, a gathering means, also sometimes referred to as the air squeezing means 60, comprises a pair of relatively thin parallel plate members 61, 62, suspended between the walls 44 and 45 of the tank T. Plates 61 and 62 are each formed so as to provide a pair of U-shaped slots or grooves 63, 64, open at the top and spaced apart from each other and from the side plates 44 and 45 of the tank T. A pair of smaller plate members 65 and 66 are sandwiched between the plates 61 and 62 and in overlapping relationship with the apertures or grooves 63 and 64. These plate members 65 and 66 are slotted so that the lower ends 67 and 68 of the slots, together with the bottom 69 and 70 of the slots or grooves 63 and 64, from oval-shaped apertures 71 and 72. The size of the apertures 71, 72 are changeable by movement of the plates 65 and 66 upwards or downwards, with respect to the plates 61 and 62, according to the number of threads that are to be gathered in the two groups 55 and 56, as can be appreciated. Plates 65 and 66 are made adjustable in any convenient manner, the slot and set screw arrangement 75 and 76 in each plate member 65, 66 being one form of accomplishing this.

From the above description so far it can be seen that the threads coming from the creel C are gathered first in three groups 15, 16, and 17 by the comb guide means 25 and then are grouped into two bundles, 55, 56, by the gathering and air squeezing means 60, illustrated in FIGURES 9 and 10. Both the gathering means 60 and the lower half of the comb guide means 25 are below the level of the liquid or heat-hardenable resin L in the tank T so that, as shown in FIGURE 6 the threads are immersed in liquid and thoroughly wet as they travel.

As can be appreciated in the study of FIGURES 6, 9, and 10, the gathering means 60 not only gathers the threads into two bundles 55, 56, but as they travel through the apertures of the gathering means it serves to squeeze or withdraw any entrained air, that is normally entrained in the threads and carried along thereby into the resin. In the practical embodiment of my invention, since the threads are fed into the tank and moved along parallel to the bottom 51, air that is released or squeezed out of the bundles 55 and 56 by the gathering means 60, flows to the top of the liquid L and backwards towards the left end of the tank, as illustrated in FIGURE 6. Baffle means (not shown) may be provided in the tank to prevent the air bubbles in the liquid L from reaching the lower entrance of the comb guide means 25, where thought necessary or desirable. Nonetheless, the liquid L is continuously moving in my tank so that there are no static or dead areas of stale resin in any place throughout the length thereof and, too, the tapering of the tank towards the end plate 54 serves to aid in this function. It is well to note here also that I have provided the tank T with a lid 77 (FIGURE 1) and have formed one side as at 78, to accommodate a conventional air conditioner A of any suitable type to prolong the life of the resin and to maintain it at a predetermined temperature when high ambient temperates prevail.

As illustrated in FIGURES 6 and 11, the bundles 55, 56, as they leave the gathering means 60 illustrated in FIGURES 9 and 10, are fed through a tensioning means, illustrated in its entirety as 80, which serves to tension the bundles as they travel through the tank from the creel C. This tensioning means 80 comprises three rods, 81, 82, and 83, each horizontally disposed on a pair of end plates 84 and 85; the latter being connected by any suitable brackets 86, 87 to the side walls 44 and 45 of the tank T. It can be appreciated, as illustrated in FIGURE 6, that in order to tension the threads it is necessary to overlap the two bundles in a manner illustrated therein, by having the two bundles 55, 56 enter the tensioning means 80 underneath the rod 81, over the rod 82, and again under the rod 83, or vice versa, over 81, under 82, and over 83; the centrally located rod 82 being above or below the horizontal plane of the other two rods, as the case may be, and where thought necessary or desirable.

As the bundles leave the tensioning means 80, they are further gathered into a sizing die, identified in its entirety as 90. Sizing die 90 comprises a two-piece body member 91, 92 having a conically shaped aperture or throat entrance 93 which gathers the two bundles of threads 55, 56 into a circular bundle of uncured rod as it is emitted from the tank T, such as illustrated as UR. Body member 91 has a horizontally extending projection 94 which provides the continuation of the tapered throat 93 through the end wall 54 of tank T and into a circular aperture 95 in the body member 92. Body member 92, on the outside of the end wall 54, is flanged as at 96 and threadably bored as at 97, so as to be suitably attached to an apertured plate member 98 by any suitable means, such as screws 100. The body 91, with its bore 93 and body 92, with its circular bore 95, serves to shape the bundle into a rod of circular cross-section of a predetermined size according to the number of threads used to make up the rod, as well as to squeeze any excess liquid resin from the threads beyond the desired amount back into the tank T so that the rod forms a circular glass rod, still uncured. I have found that the proper proportion for the rod which I make is approximately 60% glass threads and 40% resin by weight.

The uncured rod UR, as it leaves the sizing die 90 is pulled towards a wrapping mechanism indicated in its entirety as W, and illustrated in detail in FIGURES 13 and 14. Wrapping means W forms a two-piece wrapping head 110 with a slightly tapered bore 111, having its larger diameter at the entrance 112 of the wrapping head, and a smaller diameter 113 at the exit of the wrapping head 110, as illustrated in FIGURE 14. The uncured rod UR is pulled through this wrapping head 110 and is provided with a wrapping or film 114 of material from a source of supply in the form of a roll 115 (see FIGURE 1) of such material located below the top of the support S and below a plate-like chute member 116. Chute member 116 ends in line with the bottom of entrance 112, and is rounded at its entrance 117, so that the film 114 coming from the roll 115 will not be cut or otherwise damaged. When this film is fed into the entrance 112 of wrapping head 110, the chute member and wrapping head support the rod and the wrapping head serves to gradually wrap the rod UR. The width of the film is sufficiently wide to completely envelop the rod UR and overlap itself as clearly shown at 118 and 120 of FIGURE 14. Thus, as the film 114 is in its flat form as it approaches the chute 116 and is gradually tapered and enveloped by the action of the wrapping head 110 through the reaction of the conical surfaces 111 about the rod UR as it leaves the wrapping head 110, as can be seen in FIGURE 14. In order to maintain the film 114 about the rod UR, an adhesive tape 121 is applied to the overlapping edges 118, 120 beyond the wrapping head 110. This is accomplished in my invention by the provision of a roll 122 of adhesive tape 121 which rotates about a horizontal spindle 123 above the wrapping head 110 and is operatively attached to plate 124. Tape 121 is unrolled or unwrapped from the roll 122 past a roller means 125; the latter being fastened in parallel relationship to the spindle 123 on the plate 124, and is provided with flanges 126 and 127 so as to maintain the tape aligned thereon in parallel relationship. This tape 121 is then fed over a transporting means, indicated in its entirety as 130, which serves to displace the tape from a straight line relationship as it comes off the roll 122 and parallel to the rod UR to a coaxial relationship over the rod UR. This is accomplished by the transporting means 130 in the following manner. The tape 121 enters one side 131 of the transporting means which comprises a flanged metallic plate 132 bent as a three-dimensional reverse S which serves to contact the non-sticky side of the tape whereby the tape is folded at a 45 degree angle and travels at 90 degrees to the direction of the travel of the rod UR. Plate 132 is again bent so that the tape is again folded about another edge, as at 133, at a 45 degree angle, so that the adhesive side of the tape is in contacting relationship with the film 114 at the overlapping parts, as it leaves the transporting means at 134. It can be appreciated that tape 121 will first enter entrance 131, over the back side of plate 132, and be again folded and leave at 134 so as to be face down on the film.

Since this is a continuous process, at no time whatsoever is the adhesive of the tape 121 touching other than the film 114 or the spool 122 from whence it came. Flanges 135, 136 are provided on the transporting means 130 to maintain the tape properly aligned and the end 137 is so constructed and arranged to press slightly against the film 114 and the rod UR so that it will insure the adhering of the tape 121 to the wrapping film 114 and produce a fluid tight wrapping for the rod UR.

It is important to note in connection with this wrapping step in my invention that the film 114 does not have a molding function at this particular step, and that the wrapping of the film is accomplished without any stress or strain being placed on the uncured rod UR since the wrapping head 110 chute member 116 supports the rod UR in contra distinction to the type of wrapping that would be accomplished by spirally winding the wrapping film thereon.

In the practical embodiment of my invention the film 114 is a water-resistant cellophane product sold by the E. I. du Pont de Nemours & Co. (Inc.) of Wilmington, Delaware, and the tape 121 as used in my invention is the commercial Scotch-brand tape, a cellophane type tape sold by the Minnesota Mining & Mfg. Company of Minneapolis, Minn. This tape has its adhesive only on one side and can be used conveniently in the wrapping and transporting means 130 in the manner previously described.

Turning now to FIGURES 15 through 23, I will now describe the wrapped uncured rod UR as it leaves the wrapping step illustrated in FIGURES 13 and 14, and where it is seized, squeezed slightly, and held tightly by the molds M which travels with the rod through the curing oven O.

In the lower lefthand corner of FIGURE 15, the wrapped uncured rod UR is shown immediately after it has left the wrapping mechanism W prior to its being grasped by the molds M and prior to its entrance into the oven O at the lower righthand side of this figure. As can be seen, I have arranged the molds M so as to comprise a plurality of individual molds, 350 in number, M-1, M-2 . . . M-350, half of which complement the other half, to grasp the rod UR circumferentially on all sides and to squeeze the rod only immediately prior to its entrance into oven O. These molds hold the rod in this squeezed position throughout its travel in the oven O.

To accomplish this operation of molds M-1, M-2, etc., and to provide for their travel throughout the oven and to return to their original position, as shown in FIGURE 15, I have provided my machine with a pair of sprockets 150 and 151 (the latter being shown in FIGURE 20).

Sprockets 150 and 151 are spaced above the base S of the machine by any suitable means, such as by a plurality of rods 152, and a pair of bars 153, 154 (see FIGURE 19) so that the conventional bearing blocks 155 and 156 for the sprocket axles may be adequately supported. A conventional sprocket chain 157 is continually rotated about the sprockets 150, 151 by drive means D (FIGURE 20) operatively attached to the shafts of sprocket 151, and later to be described. The identical links 160 of the chain 157 are each provided with a relatively small angle iron 161 having its radially outwardly extending side 162 disposed normal to the path of travel of the links 160 and bored centrally thereof to provide a pivot point 163 for an arm 164 attached to the side 162 by any suitable means, such as by pin and nut means 165.

As shown in these figures, the molds M-1, M-2, etc. are substantially identical with one another and comprise a body 170, forming a semi-circular molding surface 171 and formed of aluminum or any other suitable material, with a radius of curvature slightly less than the radius of curvature of the uncured rod. The molds on one side of the chain 157, as viewed in FIGURES 16 through 19, differ from the molds on the other side of the chain 157 only in that those on one side are provided with flanges 173 and 174 radially outwardly of the molding surface, so that the molding surfaces may complement each other and completely encompass the rod in the oven O. Back side wall 175 of each mold is provided with a pair of outwardly extending parallel triangular shaped arms 176 and 177, the apex of which terminate longitudinally centrally of the molds. Arms 176 and 177 are bored normal to their plane to receive a bearing pin 180, the latter extending beyond the upper surface of arm 177. The purpose of bearing pin 180 will be described later.

Sandwiched between the arms 176 and 177 is a larger roller bearing means 181 which serves to close the molds and hold the same closed, as will be apparent from the ensuing description. As to be noted in FIGURES 19 and 22, the arm 164 on each of the molds is attached normal to the axial center of the mold surface 171, that is, normal to the direction of travel of the molds, so that the molds can be conveniently attached to the angle iron 161 previously referred to. Opening and closing movement of the molds is therefore normal to the direction of travel and each arm 164 is provided with a ledge 182 to rest against the outer edge 183 of side 162 to prevent any further outward movement of the mold. The outward position of each mold is substantially as shown in FIGURE 22, and a pair of parallel rods 184, 185 backed up by a pair of angle irons 186, 187 serve to hold and guide the side 162 and the molds in their travel at the top of the sprocket drive. It is to be noted also that the molds are disposed with the mold surface facing each other so that they open in the manner shown at the top of FIGURE 22 and are closed in the manner shown at the bottom of FIGURE 22. With each of the molds being substantially identical but disposed alternately on the angle irons 161, which in turn are mounted on alternate chain links 160, it can be appreciated that those molds on the right side of the chain, looking in the direction of FIGURE 22, will overlap the alternate molds on the left side of the chain, so that their respective end surfaces are in staggering or alternating relationship, thus providing a continuous mold about the rod UR when closed.

Briefly, the operation of the traveling mold system comprises the rotation of the sprockets 150 and 151 counterclockwise, so that, as illustrated in FIGURE 15, the molds shown in the lower half of this figure travel towards the oven O and are closed just before the molds enter the oven O, so as to grasp and squeeze the rod UR. Rod UR is held in this position until the molds leave the oven, such as illustrated in FIGURE 20, and means are provided, yet to be described, to open the molds prior to their travel around sprocket 151 so that they return open along the top side of the sprocket drive. In Figure 15 means, yet to be described, are provided to insure that the molds are open in case some molds may remain in a closed position as they travel back along the top of the sprocket drive towards the entrance to the oven. Means are also provided, and yet to be described, so that the molds remain open as they circulate around the periphery of the sprocket 150 so that they will close at precisely the right time as the molds grasp the rod in the entrance to the oven O.

From the above brief description of the operation of the traveling mold system, I will now describe the operation thereof in detail.

As previously mentioned the continuous, rotating sprocket chain 157 is provided with a plurality of links 160 which in turn are connected individually to a plurality of traveling molds M–1, M–2, etc. These molds are each provided with a cylindrical molding surface slightly smaller than the size of the rod UR as it is wrapped and traveling towards the oven O. That is, each mold is provided with a radius of curvature which together form a cylinder, the circumference of which is slightly smaller than the wrapped uncured rod UR. As the open molds are traveling to the left as viewed in the top portion of FIGURE 15, the molds are in their open position as viewed in FIGURE 19 of the drawings. As the molds continue to the left, each mold engages a pair of curved camming plates 190 and 191, the curved surfaces of which contact the roller bearing means 181 on each mold. It is to be noted that the ends 192, 193 of the curved plates are spaced far apart as the molds approach the plates so as to form an entrance, and that the exit ends 194 and 195 are spaced close together so as to close the molds towards each other. The purpose of this closing by the curved plates 190 and 191 is to insure that the molds are properly opened as they approach the curved path defined by the sprocket 150. This is accomplished by causing the alternate molds one side or the other to engage the mold on the other side, which mold, if in the closed position, is on or beyond the center line of the path of travel and tipped to its open position. The one mold moved by one of the plates 190 or 191, for example, as shown in FIGURE 22, would tip the other backwards to its open position. By reason of the fact that the molds are in staggered relationship, as the molds approach the curved plates one at a time, the one which follows the one immediately touching the plate and moved towards closed position will be tipped by it backwardly and towards open position. It can be appreciated this is a continuous process during operation of the machine and is a safety measure, should the molds close during the return trip from the exit end of the oven.

As previously described, as the molds are cammed by operation of the bearings 181 against the curved plates 190 and 191, the molds also approach the curved path defined by the curvature of the sprocket 150. These curved plates 190 and 191, besides insuring that the molds are open, also insure that the bearing pin 180 on each mold will be in operative contact with a pair of curved rods 196 and 197, as illustrated in FIGURES 15 and 19. These latter rods 196, 197 are suitably mounted above the path of travel of the molds as they return to the sprocket 150 and are so disposed on brackets of any suitable type, such as the U-shaped bracket 198 which is disposed on the main frame S. The curved rods conform generally with the radius of curvature of the sprocket and are provided with a narrow entrance as they are approached by the two molds by bringing the approach ends 200, 201 of the two rods towards each other, such as illustrated in FIGURE 16. From these figures, it can be seen that the plates 190 and 191 serve to bring the molds towards one another so that they will engage the curved rods 196, 197 in proper position to again be positively opened by the operation of the curved rods. These curved rods are spaced apart, as can be seen in FIGURE 16, so that the bearing pin 180 will space the molds in their normal outwardmost position, and as can be seen in FIGURES 15 and 19, the bearing pin 180 is on the outside, that is, on the side opposite the mold surfaces of the individual molds, so as to positively maintain the molds in open position to avoid any difficulty that might be encountered were the molds to close, or partially close, as they travel about the sprocket, and to not interfere with their approach to the rod UR as it travels towards the oven O.

Turning now more specifically to FIGURES 17 and 18, which are cross-sectional views taken along the lower portion of FIGURE 15, to explain in more detail the approach of the molds towards the oven O as they complete their travel around the curve defined by the sprocket 150, it can be seen that the ends 202 and 203 of the rods 196 and 197 terminate just beyond the curvature of the sprocket—that is, just beyond the curved travel of the molds, so that the molds, were they not prevented from grasping the traveling uncured wrapped rod UR, would do so by the force due to gravity. However, as shown in FIGURE 17 immediately after the ends 202 and 203 of the rods are passed, the roller bearings 181 of the molds are urged inwardly by a pair of entrance camming plates 205 and 206, the camming surfaces of which are located on each side of the rod UR. These entrance camming plates define a path which is continually narrowing towards the rod UR from their entrance ends 207, 208 to their exit ends 210, 211, so that they terminate in an inward movement of the molds at a position of gripping the rod UR. However, in order to prevent the inward movement of the molds after leaving the curved rods 196 and 197, so that they will not grip the rod UR until precisely the right position, I have provided still another pair of camming plates 212, 213 on each side of the rod UR as more clearly illustrated in FIGURE 18. Plates 212 and 213 have entrance ends 214 and 215 which contact the bearing pins 180 of the molds to prevent the molds from actually contacting the rod UR until it has passed the exit ends 210 and 211 of the first mentioned entrance camming plates 205 and 206. This last pair of camming plates 212 and 213, in combination with the entrance camming plates 205 and 206, serve to define a path of travel for the molds into an entrance for the roller bearing means 181 on each of the molds. This entrance and continued path of travel through the oven is defined by channels 220 and 221 located on each side of the rod UR, and illustrated more clearly in FIGURE 22, and means are also provided in the form of risers 216 and 217 to insure no interference between the flanges 173, 174 (FIGURES 15 and 18) and the complementary molds as the molds close. Thus, as the rod is gripped and squeezed near the end of the camming surfaces by operation of the camming plates 205, 206, 212, 213, it is held gripped and squeezed continually throughout its travel through the oven O, and while I have shown the channels 220 and 221 most clearly in FIGURE 22 taken near the end of the travel of the mold through the oven O, it is the same throughout its travel, such view being illustrative of the molds in position as they grip and squeeze the rod UR during the curing step. The reason for maintaining the molds open until the precise time of entrance into the oven O is so to accomplish the smooth surface on my rod. I deem it necessary to squeeze the rod by the molds ever so slightly to cause a bleeding of the hardenable resin immediately prior to its being cured by heat, and I prefer that the squeezing and bleeding of the resin in the rod be located in a position not too close to the wrapping mechanism W, i.e., the entrance to channels 220, 221 or to be located a distance from wrapping head W so as to prevent any bleeding of the resin backwards into the wrapping machine; such bleeding being confined within tubular surface defined by the wrapping film 114.

The actual squeezing by the molds is only a very limited amount, sufficient only to bring the resin to the surface of the rod, and beneath the film 114. Once the rod is in the oven, it is maintained under such slight pressure throughout its curing step by operation of the channels 220, 221 to roller bearings 181. Channels 220 and 221 are defined by a pair of relatively long plate members 222, 223, and 224, 225, each pair sandwiching a relatively thick, long plate member 226 and 227 therebetween. Each of these plates 222–227 extends the full length of the oven and are mounted on the frame S with the plates 222—225 extending inwardly towards the oven to form the U-shaped channels 220 and 221, as can be seen in FIGURE 22. As can be appreciated, these channels hold the molds M–1, M–2, etc. tightly against the periphery of the rod as it is being cured. The slight pressure, above mentioned, acting against the periphery of the rod to bleed the resin to the surface underneath the film 114, is increased somewhat in the oven by reason of the expansion of the resin due to heat as the rod travels the full length of the oven O.

The oven O which cures the heat-hardenable resin comprises generally, a hood indicated in its entirety as 230, U-shaped in cross-section, and which encompasses the rod as held by the molds M. Hood 230 serves to maintain the heat of the oven at a preselected temperature at various portions throughout its length in a conventional manner so as to regulate the heat of the resin throughout the curing operation. In FIGURE 22, one of the burners H–5 with a gas pipe 231 is shown as illustrative of the burners and the heat producing means. Conventional thermostats, valving means and baffle plate B are used to keep the temperatures of heat at a preselected range.

Turning now in particular to FIGURES 1, 2, and 3, it can be seen that I have illustrated five separate heating units for the oven O. These heat units are illustrated schematically as H–1, H–2, H–3, H–4 and H–5. In looking at the schematic diagram of the heating steps as illustrated in FIGURE 3, it can be seen that the temperatures which are maintained in oven O at the various steps by the heating units are regulated to coincide with the reaction temperature of the heat-hardenable resin. Superimposed on this same diagram (FIGURE 3) are the estimated representative temperatures of the resin itself at the various stations of the oven, as represented by the heat units, including the peak for the exotherm reaction temperature created during polymerization during the hardening of the resin. At this point it can be seen that the oven O is maintained coolest so as to obtain an evenness of temperature as possible throughout the oven. The mass of the molds M also contributes to the evenness of temperature in the oven O since they absorb heat when the exotherm reaction is taking place. These temperatures, as illustrated in FIGURE 3, are illustrative of the temperatures that are to be maintained, although this will vary and depend greatly on the size of the rod being cured, the particular type of resin being used, as well as the particular type of catalyst and monomer.

In the practical embodiment of my invention I have found that the oven temperatures illustrated in FIGURE 3 work very well for a polyester resin known as Paraplex–P–444 sold by Rohm & Haas Company, Washington Square, Philadelphia, Pa., and which is described by that company as an unsaturated polyester resin containing a monomeric methyl methacrylate. This P–444 resin must be blended with a monomeric styrene or vinyl toluene— preferably 80 parts resin P–444 and 20 parts of the added monomer. In this mixture three quarters of one part benzoyl peroxide is used as a catalyst, and is customarily first mixed with the styrene, then combined with the P–444 resin. Using this blend the exotherm temperatures are believed to be substantially as shown and the rod utilizing 150 spools of rovings purchased from Libby-Owens-Ford Glass Company, and known as their Garan No. 7201 grade of glass roving, will make a rod $13/16''$ in diameter in the proportions of resin and fiber mentioned above when pulled through a sizing die, such as 90, whose exit 95 is 0.8166''.

The wrapping film serves as a molding liner after it has been wrapped around the uncured rod by reason of it being squeezed onto the uncured rod allowing the resin to bleed to the surface underneath the film. It is believed that the reason that my rod can be formed to its exact dimension and is a smooth rod without any fibers extending from the surface of the finished rod which later have to be ground or otherwise removed, is because the bleeding of the resin serves to fill in crevices that exist about the periphery. In the enlarged and semi-schematic illustration of a cross-section of my rod as it is wrapped and uncured, FIGURE 2, it can be seen that the glass fiber threads, or bundles of glass threads, 232, form triangular spaces 233 therebetween. These triangular spaces are filled with the liquid resin at the time the molds M grasp and squeeze the uncured wrapped rod. It is to be noted, too, that the wrapping film 114 also serves as a liner for the molds as they grasp and perform their molding function prior to and during the polymerization of the resin in the oven.

Turning now to FIGURES 20 through 23, where I have shown the molds M as they leave the oven O. Briefly speaking, the molds leave the oven O and are brought around to sprocket 151 so as to travel again towards the sprocket 150 and the entrance to the oven O as illustrated in FIGURE 15. How this is accomplished will now be described in detail.

In order to insure that the molds M open at the desired time, I have again provided curved rods on each side of the sprocket and identified as 240 and 241, which will be noted, originate slightly beyond the end of the oven O.

The ends 242 and 243 of the respective rods 240 and 241 are positioned relatively close together, as illustrated in FIGURE 21 and curved upwardly to provide a smooth entrance point, or track, for exit of the molds from the oven (end 242 being shown in FIGURE 20). The rods 240 and 241 are then bent so as to be spaced relatively far apart, as illustrated in FIGURES 21 and 23 at 244 and 245, to open the molds, as will be apparent. The entrance ends 242 and 243 are positioned just beyond the ends of the channels 220 and 221, as more clearly shown in FIGURE 20, and the distance between the ends 242—243 is less than the distance between the bearing pins 180 on the molds as they travel in these channels, so that these pins will be contacted and outwardly moved by action of the rods as they leave these channels, as illustrated at 244 and 245, thus opening the molds, such as illustrated in FIGURE 23. Rods 240 and 241 continue spaced apart and follow generally the curved path defined by the sprocket 151 for the molds; bearing pins 180 always being maintained outwardly, so that the molds will be insured in their open position. In this manner the rods 240 and 241 function in a manner similar to the rods adjacent the sprocket 150, previously described, except that they serve to open the molds whereas the other rods serve to hold the molds open until acted upon by the entrance cams. After the center of the sprocket 151 has passed, the rods 240 and 241 are then formed so as to come closer to the axis of rotation of the sprocket 151 and further apart from each other, as illustrated at 246 and 247, in FIGURES 20 and 22, so that the operation of gravity can function to maintain the molds and the ledge means 182 of arm 164 against the edge 183 of the angle iron arm 161, previously described. In this connection the molds will remain open due to gravity and are held in this open position to the return about the sprocket 150, as previously described, and the chain links 160 are held in vertical relationship by support bar 248 and a pair of tapered entrance guides 250, 251 (FIGURE 22).

In further connection with FIGURE 20, it is to be noted that I have shown two links of a chain drive identified as 252 and 253 which form part of the drive means D, previously mentioned, for the driving sprocket 151 which in turn serve as the driving means for both sprockets 150 and 151. Driving means D contains conventional sprockets and a suitable source of power, such as an electric motor (not shown) equipped with an infinitely variable speed changer (also not shown).

Having thus described the molding and curing function of my machine I will now describe the cured rod as it leaves the oven O through the hitch feed mechanism H which serves originally to pull the rod from the creel C to hold the rod under tension through the curing stage and push the rod further to the cutter RC later to be described.

One of the purposes of the hitch feed mechanism H is to maintain the travel of the rod R at a smooth, constant velocity which is necessary and important if the curing is to be maintained at the desired rate of curing, as described above and diagrammatically shown in FIGURE 3. It can be appreciated any changes in velocity would naturally have an undesirable effect on the curing of the rod.

Turning now to FIGURES 24–27, it can be seen that the hitch feed mechanism H comprises two carriers or traveling vises, indicated respectively in their entirety as 260 and 261, which are cam actuated by camming means 262 and 263, the latter being fixedly mounted on a rotating shaft 264 mounted on frame S. The shaft 264 is synchronized in its rotation to the driving means D through the sprocket means 265 so as to be synchronized with the sprockets 150 and 151 so that there is an automatic and continuous synchronization of the vises 260 and 261 with respect to the molds M. This is to avoid any possibility of slippage or pulling of the rod faster or slower than the rod is being drawn through the molds during the curing step.

Cams 262 and 263 are each respectively operatively connected to the vises 260 and 261 so as to provide movement of the respective vises independently of one another, alternately grasping the rod and moving it to the right (as shown in the drawings). To accomplish this operative connection vise 260 has a pair of parallel extensions 266 and 267 extending towards the camming means 262 from a vertically disposed bar 268 on which they are mounted in any suitable manner such as by bolt means 270. Vertical bar 268 is formed at each end with steps 271, 272, to receive a pair of horizontally disposed bearing bars 273 and 274 attached thereto by any suitable means such as bolts 275. Bearing bar 273, being the upper bar as illustrated in FIGURES 26 and 27, is apertured near its outer end and provided with a pair of sleeve bearing means 276 and 277. Sleeve bearings 276 and 277 receive horizontally disposed parallel bars 278 and 279 so as to mount the bearing bar 273 in sliding parallel relationship. Similarly, the lower bearing bar 274 is provided with apertures and sleeve bearings 280 and 281 to receive a pair of horizontally disposed parallel bars 282 and 283. Bars 278 and 279, as well as bars 282 and 283, are each parallel to each other, as illustrated in FIGURES 26 and 27, and terminate in end plates 285 and 286 mounted on the frame S in any suitable manner.

With the bar 268 biased to the left by spring 290 attached at one end thereof and to the other end to the fixed plate 285, it can be seen that the camming roller means or follower 291 mounted between the parallel plates 266 and 267, will continuously follow the curvature of the camming means 262 as the latter rotates. In that manner the vise 260 is moved to the right by operation of the camming means 262 and to the left by the spring means 290 under the influence and control of the camming surface on camming means 262, as can be appreciated. The camming means 262, 263 are constant rise cams which impart a constant velocity to their cam followers.

Outwardly of the rods 278, 279, 282, and 283, there is mounted still another camming means 293 (see FIGURE 25) fixedly mounted on the shaft 264 so as to be synchronized with the camming means 262, which operates a conventional air pressure responsive valving means 294 by action of spring biased plunger 295 of the valve in contact therewith. Rotation of the shaft 264 with camming means 293 will actuate the air responsive valve 294 intermittently, which, in turn, being connected to a suitable source of air pressure (not shown) serves to actuate a piston (not shown) in an air pressure piston assembly, indicated in its entirety as 296. As can be appreciated in studying FIGURES 25, 26 and 27, air piston assembly 296 is mounted on the top bearing bar 273 by any suitable means, such as by bolt means 297, which assembly includes a portion of the clamping jaws of the vise, as will be explained.

Attached to the piston rod 300 of the cylindrical piston assembly 296 is one jaw 301 which moves back and forth to grasp and release the rod R by actuation of the piston in the cylinder assembly 296. This jaw 301 is provided with an arcuate surface 302 on a liner 303 which complements still another arcuate surface 304 in liner 305 on an immovable jaw 306; arcuate surface 302 and 304 serving to grasp the rod without damage. Jaw 306 forms part of the vise assembly 296 which is bolted to the bearing plate 273, as can be appreciated. Actuation of the piston serves to close the jaws and grasp the rod at a time when the camming means 262 is moving the vise 260 to the right. The movable jaw 301, when the air pressure is released behind the cylinder of piston assembly 296 by operation of the camming means 293 and valve means 294, will be opened by a compression spring 307 operatively located between the two jaws 301 and 306. Pairs of bearing pins 308, 309 serve to guide the jaws in the vise body, as can be appreciated.

It can be appreciated, therefore, that if the jaws 301, 306 of traveling vise 260 were open as the vise is under the influence of the spring 290 to move the same to the left, and if the jaws 301, 306 were closed as the vise 260 is under the camming influence of the camming means 262, it would serve to pull the rod R to the right. Two such movable vises, 260 and 261, the latter being previously referred to, provide identical operation to provide smooth, constant velocity movement. Thus, vise 261 is cammed by the camming means 263 mounted on the shaft 264 to work asynchronously with the vise 260 so that when vise 260 is moving to the left, vise 261 is pulling the rod to the right and, conversely, when vise 261 is moving to the left, vise 260 is pulling the rod to the right. I have also formed the camming surface configuration of the camming means 262 and 263 so that there will be a time overlap in the pulling stroke to prevent any discontinuity of movement of the rod R. Thus, as vise 260 nears the end of its pulling stroke, the vise 261 has already reached the end of its left stroke, has grasped the rod and is pulling the rod to the right as the vise 260 completes its stroke to the right and releases the rod. Similarly, vise 260 will grasp the rod and move to the right as the vise 261 nears the end of its pulling stroke and prior to the time it releases the rod. Since the camming means 262 and 263 are commonly driven with the molds M by operation of the common source of power D, smooth, constant velocity for the rod R is accomplished.

It can be appreciated from the drawings and from the above description that the vise 261 is identical with the vise 262 described in detail, except that its extensions 310 and 311 (which perform the exact functions as the extensions 266 and 267 on vise 260) for maintaining the rolling means or follower 312 against the camming means 263 are shorter than extensions 266, 267 so as to permit the vise 261 to complete its stroke to the left or to the right, without interference from the vise 260. Also the camming means 313 is identical in structure and function to the camming means 293 for operating air responsive valve 314 synchronously with the air responsive valve 294 to operate the air piston assembly of the vise 261 to which valves 314 is operatively connected. Since these structures are substantially identical except for the shortness of the extensions previously referred to and the asynchronous movement of the camming means 263 and 313, no further description is deemed necessary herein. Note, however, that in order to obtain the time overlap for the pull and return strokes of the vises 260 and 261, the surface of the cams 293 and 313 must be also arranged for a time overlap for actuating the valves 294 and 314, as can be appreciated.

In the event that one of the vises, either 260 or 261, fails to release at the end of its stroke so that either of the vises is carried on by the traveling of the rod through the operation of the remaining vise, as for example, should 261 fail to release at the end of its pulling stroke and 260 would grasp the rod and continue on, means are provided as a safety means to shut off the entire operation to prevent damage to the hitch feed mechanism. This is accomplished in the embodiment disclosed by the provision of an electrical stop switch 315 in the main electric power control line of the main electric drive motor. On each of the vises there is provided a plate means 316 and 317, the lower surfaces of which form a camming surface, as at 318 and 319, which are so positioned relative to the stop button 320 that they do not contact the stop button 320 at the end of either of their pulling strokes. Thus, when vise 260 or 261 are moving to the right, the camming surfaces 318 or 319 do not reach the button 320, yet if either of the vises is carried on by the fact that its respective jaws grasping the rod R are not released at the end of the stroke, a continuation of the stroke by either of the vises will serve to break the electrical circuit to the main motor and stop the entire machine without damage either to the rod or to the hitch feed mechanism.

While I have shown the movable jaw and its air cylinder assembly of each of the vises 260 and 261 as being located on the same side of the rod R, obviously one of the vises could be located on the other side of the rod R, where thought necessary or desirable.

After the rod R leaves the above described hitch feed mechanism H, it continues on to the cutter mechanism RC and the drop-out mechanism K, previously referred to and illustrated in detail in FIGURES 27 through 31. The cutoff mechanism RC and the drop-out mechanism K will now be described.

In FIGURE 28, a cut-off mechanism RC can be seen to comprise a power driven cutter blade 330, of any conventional type usable to cut plastics or the like, operated by a conventional electric motor 331 by continuous belt means 332 and driving and driven pulleys 333 and 334. A conventional dust hood and air line 335 are also provided about the cutting blade 330 to carry away any excess dust created by the cutting of the rod by the blade 330. This entire assembly 330—335 is mounted on a substantially horizontally disposed pivotal base plate 336; driven pulley 334 and blade 330 being mounted on one end 337 of the pivotal base plate 336. Pivotal base plate 336 is pivotally mounted substantially centrally thereof by downwardly extending bearing means 338 forming one-half of a bifurcated mounting bearing means 340, both of which have a horizontally disposed shaft 341 forming the pivot for the base plate 336. Base plate 336 is thus operated as a lever by operation of a link means, illustrated in its entirety as 342, and attached to the opposite end 343 of the pivotal base plate 336. As illustrated in these figures, movement upward and downward of a piston 344 forming part of an air piston assembly 345 will cause the blade 330 to move to and from the rod R. The amount of travel of blade 330 is arranged to cut the rod crosswise when the piston 344 is actuated to its uppermost position.

Since the movement of the rod R is continuous, means are provided for causing the entire cut-off assembly 330—345 to move at a speed equal to the speed of the rod R. This is accomplished by mounting this entire assembly on an axially movable base 347 and by immovably attaching thereto a vise means, indicated in its entirety as 350. Briefly, the grasping of the rod R by the vise means 350 will cause the base 347 to move the entire assembly 330—345 at the speed of the rod so that the cutting blade 330 will cut the rod normal to its axes.

Vise means 350 is similar in its construction and operation to the vise means 260 and 261, described in connection with the hitch feed mechanism H, and comprises a vise body 351 having an upwardly extending end portion 352 which forms a backing for a jaw 353 having an arcuate surface 354. A movable jaw 355 having a complementary arcuate surface 356 serves to grasp the rod without damage and is axially movable by being mounted on an axially movable piston rod 357 forming part of an air piston assembly 358. As in the case of the vises 260 and 261, a pair of parallel pins 360 and 361 are provided to provide proper alignment of the jaw 355 with respect to the jaw 353 in its movement with the rod 357. As can be appreciated from this description, actuation of the piston by the air responsive cylinder in the piston mechanism 358 causes the jaw to open and close and grasp and release the rod at a specified time. Since this entire assembly 350 is mounted on the axially movable base means 357 as by bolts 363, movement of the rod R when the jaws 353 and 355 grasp the rod, will cause the entire assembly mounted on the base plate 347 to move axially therewith.

In order to provide for axial sliding movement of the mounting base means 347, the latter is provided with a pair of downwardly extending bearing means 364 and 365 which receive a pair of parallel tubular bearing shafts 366 and 367 for axial sliding movement therein. Bearing shafts 366 and 367 are mounted to the frame S in any suitable manner, such as by end plates 368 and 370. Thus, as the rod R is grasped and released by the actuation of the jaws of the vise 350, the entire mechanism RC can be made to slide along the shafts 366 and 367 a desired length of time. The amount of travel to be done by the mechanism RC will depend, of course, upon the length of time required to cut the rod R through. When the rod R is cut through, the vise will release the rod and the entire mechanism is biased, as by spring or by pulley and weight, to return to its original position, that is, to the left, as viewed in FIGURE 29, until the rod R is again of the desired suitable length. Obviously, too, the release of the rod by the vise after the cutting stroke of the cutting blade will simultaneously cause the blade to move in the position, such as shown in FIGURE 28, to prevent any interference by the blade with the continuation of the uncut rod. Note, too, that to provide proper support for the cutting operation, jaws 353 and 355 are extended to adjacent the blade 330 as at 371 and 372 (FIGURE 29).

Turning now in particular to FIGURES 29 through 31, it can be seen that the rod R, after having been cut by the cut-off mechanism RC, enters a drop-out and measuring means, illustrated in its entirety as 380. Drop-out mechanism 380 is provided with a tapered entrance 381 into which the rod R will be directed as it moves past the cutting mechanism RC. Rod R is slidingly received in a tubular member formed by two angle irons 382, 383 placed in face-to-face position with each other and shown in cross-section in FIGURE 31. Angle iron 382 is permanently attached to an angle iron 384 which in turn is permanently attached, while the other angle iron 383 is mounted on one end of a camming arm 385. Camming arm 385 is pivotally connected about immovable pivot point 386 formed midway thereof. The other end of arm 385 is pivotally connected, as at 387, to one end of a link 390, the latter being attached at its other end at still another pivot point 391, formed in the end of a piston rod 392. Piston rod 392 forms part of an air responsive piston assembly 393 and movement inward and outward of the piston rod 392 by the action of the air responsive piston head (not shown) in the assembly causes the pivot points 391 and 387 to move to a position shown in dotted lines in FIGURE 31, thus opening the tubular member and permitting the cut rod R to drop out into a bin (not shown) below the drop-out mechanism. Stop means 394 are provided to stop the downward movement of the camming arm 385 and the movable angle iron 383 is further hingedly attached to the main frame S as at 395, 396 through supporting plate 397, 398 to form the pivotal connection about which the angle iron 383 moves.

As can be appreciated, suitable trip means actuated by the end of the rod R as it is being received in the dropout means 380 is provided and illustrated schematically as at 400 and is conveniently located along any of the suitable positions set forth by the scale 401 formed on the tubular member. As the rod R moves towards the trip mechanism 400, the lower angle iron 383 is in closed position, with the piston rod 392 moved to its innermost position. When the rod R reaches the switch 400, it actuates a piston assembly 358 to close the jaws on assembly 350 of the cut-off mechanism RC. The closing of the jaws in turn actuates the piston assembly 345 to feed continuously rotating cut-off blade. After blade 330 cuts the rod completely, a switch (not shown) causes piston assembly 345 to reverse. At the end of the reverse stroke, piston assembly 345 actuates another switch to open the jaws of assembly 350 and causes arm 385 to drop. The dropping of arm 385 actuates still another switch to cause cylinder 393 to bring arm 385 up again. As previously described, the operation of these three elements of the cutoff mechanism serve to cut the rod into the desired length and, obviously, this operation is repetitive. Since the valving mechanism and the switch mechanisms necessary to operate the various pistons and valves actuating the cut-off mechanism RC and the drop-out mechanism K are conventional, no further description thereof is deemed necessary herein.

From the above description of the illustrated embodiment of my apparatus and in summation thereof, it can be appreciated that my invention comprises both an apparatus and a method of producing resilient fiber glass rod. The method comprises the gathering of threads and continuously drawing these threads under tension through a bed of liquid heat-hardenable resin, gathering the threads into a rod-like bundle, squeezing out any air entrapped between the gathered threads while the same is in the bed of hardenable resin, compressing the rod-like bundle into a predetermined cross-sectional shape and size of uncured rod, wrapping the uncured rod with a film of water-resistant material, squeezing the wrapped rod into a mold of a predetermined cross-sectional shape and size so that the resin will bleed to the surface underneath the film, passing this wrapped rod through an oven to cure the rod while being continuously held by the mold, cutting the cured bundles into desired lengths. Where necessary or desirable, the water-resistant film may be removed from the rod.

Where herein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

I claim:

1. In apparatus for heat curing cylindrical fiber glass rod formed of gathered fiber glass strands having liquid heat-hardenable resin applied thereto, in combination, a curing oven through which the rod formed of gathered fiber glass strands having liquid heat-hardenable resin applied thereto is movable longitudinally, rigid mold means of good thermal conductivity comprising complementary mold members movable through said oven with said rod, said mold members having complementary semi-cylindrical rod contacting surfaces each of the same radius from end to end, said mold members having closing and opening movements, and means operable to close said mold members in proximity to the inlet of said oven to grip and squeeze the surface of the rod and to compact the fiber glass strands together with said semi-cylindrical rod contacting surfaces, said semi-cylindrical rod contacting surfaces continuing rigidly to grip and squeeze the surface of the rod and to compact the fiber glass strands together in the movement of the rod and mold means through the curing oven to produce a rod with a mirror like surface and having high resistance to flashover due to lightning.

2. Apparatus according to claim 1, wherein the complementary semi-cylindrical rod contacting surfaces of the mold members together form a cylinder the circumference of which is slightly smaller than the circumference of the fiber glass rod prior to gripping and squeezing of the surface of said rod by said semi-cylindrical rod contacting surfaces.

3. Apparatus according to claim 1, wherein there is an endless carrier for said rigid mold means, said carrier having one run thereof movable through the curing oven and the other run movable outside the curing oven, said rigid mold means comprising a plurality of sets of complementary rigid mold members pivoted to said endless carrier for swinging movements to closed and opened positions in planes generally normal to the path movement of the endless carrier, and cam means coacting with said mold members for swinging same to closed position in proximity to the inlet end of the oven and into open position in proximity to the outlet end of the oven.

4. Apparatus according to claim 1, wherein there is an endless carrier for said rigid mold means, said carrier having one run thereof movable through the curing oven and the other run movable outside the curing oven, said rigid mold means comprising a plurality of sets of complementary rigid mold members pivoted to said endless carrier for swinging movements to closed and open positions in planes generally normal to the path of movement of the endless carrier, and cam means coacting with said mold members for swinging same to closed position in proximity to the inlet end of the oven and into open position in proximity to the outlet end of the oven, the cam means for swinging said mold members to closed position in proximity to the inlet end of the oven comprising camming members defining a path which continuously narrows toward the rod from the entrance ends to the exit ends of said camming members.

5. Apparatus according to claim 1, wherein there is an endless carrier for said rigid mold means, said carrier having one run thereof movable through the curing oven and the other run movable outside the curing oven, said rigid mold means comprising a plurality of sets of complementary rigid mold members pivoted to said endless carrier for swinging movements to closed and open positions in planes generally normal to the path of movement of the endless carrier, and cam means coacting with said mold members for swinging same to closed position in proximity to the inlet end of the oven and into open position in proximity to the outlet end of the oven, the cam means for swinging said mold members to open position in proximity to the outlet end of the oven comprising curved rods which contact bearing pins carried by said mold members.

References Cited in the file of this patent

UNITED STATES PATENTS

| | | |
|---|---|---|
| 2,126,453 | Criley et al. | Aug. 9, 1938 |
| 2,673,583 | Skog | Mar. 30, 1954 |
| 2,684,318 | Meek | July 20, 1954 |
| 2,707,816 | Henderson | May 10, 1955 |
| 2,721,599 | Van de Vanter | Oct. 25, 1955 |
| 2,778,404 | Macy et al. | Jan. 22, 1957 |
| 2,816,595 | Hudak | Dec. 17, 1957 |
| 2,817,875 | Harris et al. | Dec. 31, 1957 |
| 2,866,230 | Holte | Dec. 30, 1958 |